United States Patent [19]

Ashby

[11] Patent Number: 5,050,023
[45] Date of Patent: Sep. 17, 1991

[54] DISKETTE SEQUENTIAL LOADING AND STORING APPARATUS

[76] Inventor: Harrel D. Ashby, 1200 N. Marion, R.R. #2, Box 247A, Hinton, Okla. 73132

[21] Appl. No.: 664,543
[22] Filed: Mar. 4, 1991

Related U.S. Application Data

[62] Division of Ser. No. 457,971, Dec. 27, 1989.

[51] Int. Cl.[5] .............................................. G11B 17/08
[52] U.S. Cl. ................................................ 360/98.06
[58] Field of Search .............. 360/98.06, 98.05, 98.04; 414/798.1; 369/191

[56] References Cited

U.S. PATENT DOCUMENTS

| 4,644,427 | 2/1987 | Ashby | 360/98.06 |
| 4,654,732 | 3/1987 | Mesher | 360/98.06 |
| 4,688,124 | 8/1987 | Scribner et al. | 360/98.06 |
| 4,693,659 | 9/1987 | Burke et al. | 360/98.04 |
| 4,813,838 | 3/1989 | Santeusanio | 360/98.05 |

Primary Examiner—Robert S. Tupper
Attorney, Agent, or Firm—Laney, Dougherty, Hessin & Beavers

[57] ABSTRACT

An apparatus for sequentially feeding diskettes from a feed magazine alternately into one of two alternately used drop chutes. Each drop chute sequentially feeds received diskettes into a disk drive subassembly which drives the disk in rotation for purposes of testing or software placement thereon. After completion of testing or the like in the respective one of the disk drive subassemblies, the diskette is automatically released, and gravitates down to a sorting location where bin loading subassemblies load the diskettes into a selected one of a plurality of bins.

9 Claims, 4 Drawing Sheets

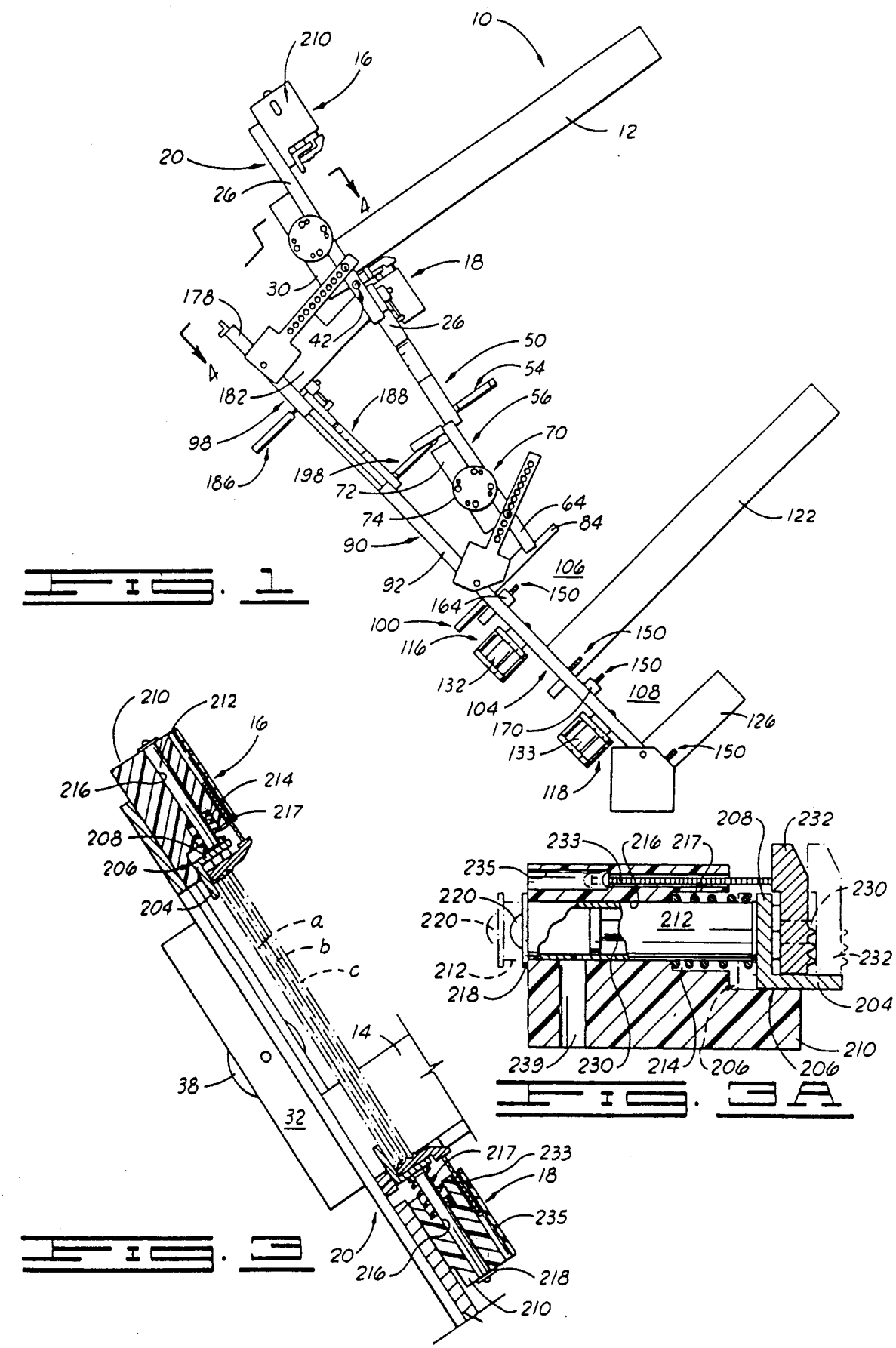

DISKETTE SEQUENTIAL LOADING AND STORING APPARATUS

This is a divisional of copending application Ser, No. 07/457,971 filed on Dec. 27, 1989.

BACKGROUND OF THE INVENTION

1. Field of the Invention

The present invention relates generally to computer peripheral support equipment, and more particularly, but not by way of limitation, to processing equipment for high speed handling of large volumes of jacketed diskettes which are to be tested, or to be loaded with software, and then selectively placed in bins for storage or other disposition.

2. Brief Description of the Prior Art

The development of computer technology has included the advancement and treatment of various types of associated equipment, often referred to as computer peripherals. Such peripherals include diskette handling structures which have undertaken to test or to load software onto diskettes of the type widely used in microcomputers.

In the mass handling of these diskettes used as memory devices for many microcomputers, the diskettes, also called floppy disks, are comprised of a magnetically coated vinyl disk which is flexible and fragile. Because of these characteristics, the disk media is placed in a protective jacket or cover. The jacket or cover is provided with a centrally located hole for access to the disk which has a drive pole that is shaped to be placed over the driving spindle of a disk drive apparatus. The jacket in which the disk is located is sufficiently large that the disk can freely rotate while the jacket is maintained in a fixed position within the disk drive apparatus. The disk contains a material which can be selectively magnetized in a computer readable format, and serves as both a temporary and a permanent memory bank for many computers. A support industry has developed to supply diskettes which contain predetermined computer structures, known as software, with such being supplied to users of many computers. Also, jacketed diskettes are sold for word processing and other data handling uses in the large number of minicomputers that are used by small and large businesses alike.

In order to meet the demand for such diskettes, large numbers of diskettes must be rapidly tested during the manufacturing and supply procedures. Each of the diskettes is individually tested by a computer write/read technique wherein a pre-established format is magnetically printed on the disk media, and this format is then read back for accuracy, and the disk media is then erased to become a blank diskette. A large number of such blank diskettes are then magnetically imprinted to carry a preselected set of software instructions. It becomes a matter of necessity that such diskettes be handled by devices that move them into and out of engagement with testing and software writing systems in a high speed mode, while maintaining the physical integrity of the diskette media.

Diskette loading devices have heretofore been manufactured for the purpose of holding the diskettes in large numbers, or in bulk, and then individually feeding these (loading) diskettes from a magazine, or the like, into and out of engagement with disk drive peripherals which are manufactured by a number of companies. The prior art diskette loading devices have operated by using sets of revolving pinch wheels which grip the edges of the jacket in which the diskette is encased and move the diskette in a selected path. One set of the pinch wheels is disposed to insert a diskette in one direction into the nesting channel of the disk drive apparatus. Another set of wheels is disposed to grippingly engage the diskette to reverse its path in order to retrieve the diskette from the disk drive apparatus after it has undergone testing and software imprinting. Once retrieved, the diskette is routed via pinch wheels into a selected one of a plurality of sorting bins.

Although the described diskette loaders have generally met the need for rapid processing of diskettes, the loaders require a considerable amount of maintenance in order to remain in satisfactory operating condition. Moreover, the useful service life of such loaders is generally short. Improvements in diskette loading devices are therefore needed, and are being continuously sought within the recognized desiderata that such loaders have a minimum of moving parts in order to reduce their maintenance cost, while at the same time, sufficiently accurately handling large numbers of diskettes that the apparatus can be reliably reused over a satisfactory period of time to effectively test, imprint and sort the diskette devices.

SUMMARY OF THE INVENTION

This invention provides an improved diskette loading apparatus which comprises a diskette magazine which holds many jacketed diskettes which are superimposed upon each other in the magazine. At one end of the magazine toward which the diskettes are gravity fed during operation of the apparatus, a pair of sequential diskette feed subassemblies is provided which release the diskettes one-at-a-time into one of a plurality of alternately utilized drop chutes. Each of the drop chutes into which the diskettes are alternately fed in consecutive sequence guides and directs each diskette into one of at least two disk drive subassemblies. These disk drive subassemblies are usable for purposes of testing and for software placement on the disk. Each of the disk drive subassemblies sequentially receives the diskettes for interaction therewith. Each of the disc drive subassemblies is associated with guide rails which guide the diskettes into and through the disk drive subassembly during, and subsequent to, testing or software placement.

Each of the drop chutes defines a diskette holding station downstream from, or below, each of the respective disk drive subassemblies. These holding stations are simply for the purpose of enabling each diskette, after it has been tested, or software placed thereon at the respective disk drive subassembly, to be retained until diskettes which may be moving through the apparatus via the other drop chute have cleared the way and moved into a downstream storage bin or the like. A multiplicity of the storage bins can be provided, but in a preferred embodiment, two of the storage bins are placed in a serial arrangement along the path of movement of the diskettes as they gravitate downwardly on a sorting ramp after leaving their respective drop chutes.

The diskettes are sorted by a suitable sorting mechanism as they move down the sorting ramp, so that some of the diskettes are retained at a first bin loading station for placement by a first diskette bin loading subassembly into a first bin, which may for example be a "non-defective diskette" bin. Others of the diskettes which are defective pass through the first bin loading station to a second bin loading station where a second diskette bin loading subassembly elevates the diskettes in sequence into a second bin. The second bin functions to receive defective diskettes determined to be flawed during the testing procedure carried out at one or both of the disk drive subassemblies.

The diskette feeding subassemblies by which a single diskette is fed from the feed magazine to one or the other of the drop chutes are novelly constructed so as to provide maximum assurance that the diskettes will feed one at a time, and one immediately after the other, from a multiplicity of diskettes stored in the feed magazine, without jamming or fouling of the feed mechanism. This is essential in the apparatus of the present invention because it is a high speed apparatus, and it is necessary for the diskettes to flow smoothly and evenly in alternating sequence into the drop chutes for passage into the disk drive subassemblies, and ultimately into the storage bins, at maximum speed. As the diskettes move along at least two paths which are ultimately merged into a single flow path in the sequential feeding and sorting apparatus of the invention, the diskettes must accomplish such movements without interference with each other.

GENERAL DESCRIPTION OF THE DRAWINGS

FIG. 1 is a side elevation view of the diskette sequential loading and storing apparatus constructed in accordance with the invention.

FIG. 3 is a sectional view taken along line 3—3 of FIG. 2.

FIG. 3a is an enlargement of the sectional view of the diskette feeding gate structure.

DETAILED DESCRIPTION OF A PREFERRED EMBODIMENT OF THE INVENTION

Figure 4:
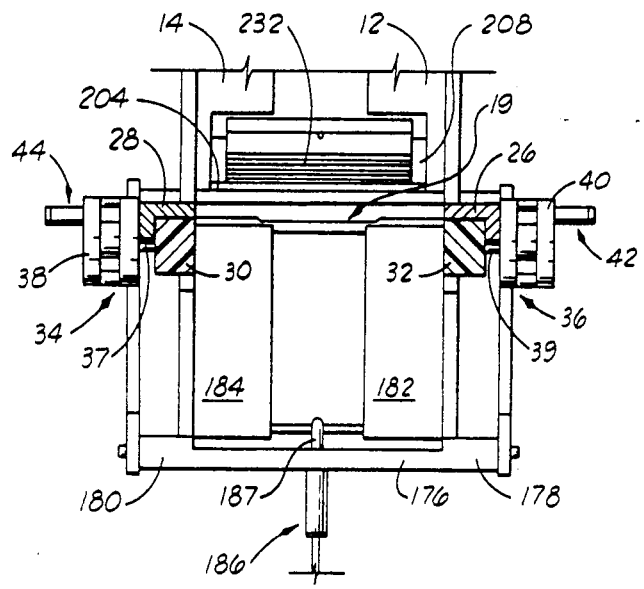
FIG. 4 is a sectional view taken along line 4—4 of FIG. 1.

Referring initially to FIG. 1 of the drawings, the diskette sequential loading and storing apparatus of the invention includes a diskette feed magazine denominated generally by reference numeral 10. The diskette feed magazine 10 includes a pair of angle member tracks 12 and 14 which together form a diskette feed channel (see FIGS. 1-3). By means of the feed channel, the jacketed diskettes, which are of rectangular or square configuration, can be fed by gravity from the upper end of the feed channel, as shown in FIG. 1, toward a pair of cooperating unique diskette feeding gate subassemblies, designated generally by reference numerals 16 and 18, and hereinafter described in greater detail.

At this point in the description of the general and sequential operation description of the invention, it will suffice to point out that the function of the diskette feeding gate subassemblies 16 and 18, which are spaced on opposite sides of the path of diskettes downwardly along the feed channel, is to engage and release the diskettes one at a time into either of two alternate drop chutes. The drop chutes simply represent two different routes by which diskettes can be concurrently gravitated through the apparatus. The diskette feeding gate subassemblies 16 and 18 assure that only a single one of the diskettes is released into the appropriate drop chute at one time, while the remainder, which are stacked behind the released diskette, remain in position and are then, immediately after the release of the leading diskette, placed in a position so that the next in line will be released following a very short time interval, and in accordance with the programmed sequencing.

The diskette feeding gate subassemblies 16 and 18 are mounted on the opposite sides of a large, generally rectangular window or opening 19 formed through the upper end of an elongated first drop chute frame, designated generally by reference numeral 20. The first drop chute frame 20 defines a first diskette drop chute which is formed, in part, by a pair of opposed, substantially parallel grooves 22 and 24 formed in opposed, parallel side rails 26 and 28 of the drop chute frame 20 (see FIG. 9).

The grooves 22 and 24 in the side rails 26 and 28 are aligned at their upper ends with the upper surfaces of a pair of spaced, generally rectangular elongated piston blocks 30 and 32. The piston blocks 30 and 32 form parts of a pair of drop chute selecting piston and cylinder subassemblies 34 and 36, respectively. The cylinder which is operatively connected to the piston block 30 by piston rod 37 is designated by reference numeral 38, and that by which the piston block 32 is operated is designated by reference numeral 40, and these cylinders form parts of the piston and cylinder subassemblies 34 and 36, respectively. The cylinders 38 and 40 are mounted on the opposed sides of the first drop chute frame 20 by securement to the respective rails 26 and 28.

In the position in which the drop chute selecting piston and cylinder subassemblies 34 and 36 are shown as mounted, the respective piston blocks 30 and 32 are retracted, and their opposed faces are aligned with the opposed sides of the opening 19 through the upper end of the first drop chute frame 20 (see FIG. 4). At the time that the cylinders 38 and 40 are actuated to extend the piston blocks 30 and 32, these piston blocks extend parallel to the opposed sides of the opening 19, but are positioned slightly inwardly from the opposed sides of the opening, and inwardly from the rails 26 and 28 so as to block passage of one of the diskettes through the opening at that time (see FIG. 4). At this time, the piston blocks 30 and 32 also function to guide the released diskette into the opposed parallel grooves 22 and 24 formed in the side rails 26 and 28, and collectively forming a part of the first drop chute. In this position, the upwardly facing surfaces of the piston blocks are aligned with the bottoms of the grooves 22 and 24.

At a location between the drop chute selecting piston and cylinder subassemblies 34 and 36, and immediately upstream from the open upper ends of the grooves 22 and 24 and aligned therewith, is a first pair of diskette arresting piston and cylinder subassemblies 42 and 44. These arresting piston and cylinder subassemblies 42 and 44 are mounted on opposite sides of the first drop chute frame 20 at a location which is immediately adjacent the opening 19. These subassemblies 42 and 44 are mounted so that their respective piston rods 46 and 48 will be extended across the openings to the grooves 22 and 24, and will block the entry of a diskette into these grooves until such selected times as the elongated piston rods are retracted.

At the time of such retraction of the piston rods 46 and 48, a diskette which is then resting upon the extended piston blocks 30 and 32 of the two chute selecting piston and cylinder subassemblies 34 and 36 will be allowed to gravitate into the grooves 22 and 24 in the side rails 26 and 28, and to proceed on downwardly in the first drop chute. The elongated parallel grooves 22 and 24 in the side rails 26 and 28 extend further downwardly in the apparatus to a location where the first disk drive subassembly 50 is located. The first disk drive subassembly 50, which retains the disk in a stationary position while it is selectively encoded, read, is a conventional structure, and details of its construction are explained in my U.S Pat. No. 4,644,427 which, for the purpose of further explanation of the disk drive subassemblies utilized, is incorporated herein by reference.

Figure 5:
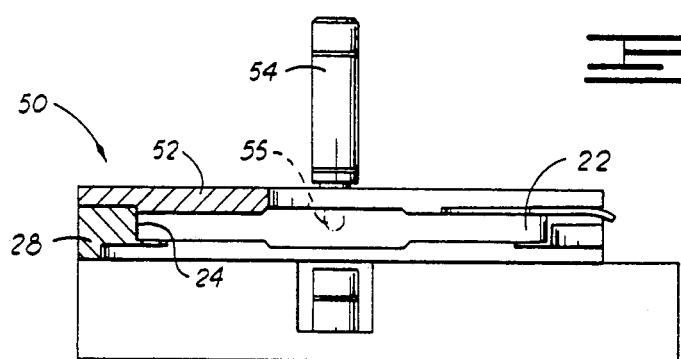
FIG. 5 is a sectional view taken along line 5—5 of FIG. 2 through the first and second disc drive subassemblies.

A slotted plate 52 which forms a part of the first disk drive subassembly 50 carries a small, first diskette arresting piston and cylinder subassembly 54. This first diskette arresting piston and cylinder subassembly 54 is mounted so that its piston rod 55 (shown in dashed lines in FIG. 5) can be extended through the plate 52 into the path of movement of a diskette which has its edges located in the opposed parallel grooves 22 and 24 at a time when the diskette is in the first disk drive subassembly 50. As will be subsequently explained, the timed actuation of the first diskette arresting piston and cylinder subassembly 54 is such that the diskette is retained at the first disk drive subassembly station for an adequate time to permit the disk to be inscribed with the software program, or read, as may be required. This timing is also correlated to the movement of other diskettes through the apparatus so that there is no interference between the movements of the diskettes, and the sequencing and movement of the diskettes is controlled to assure that a maximum number of diskettes will move through the apparatus and be sorted and stored in a given time.

Figure 6:
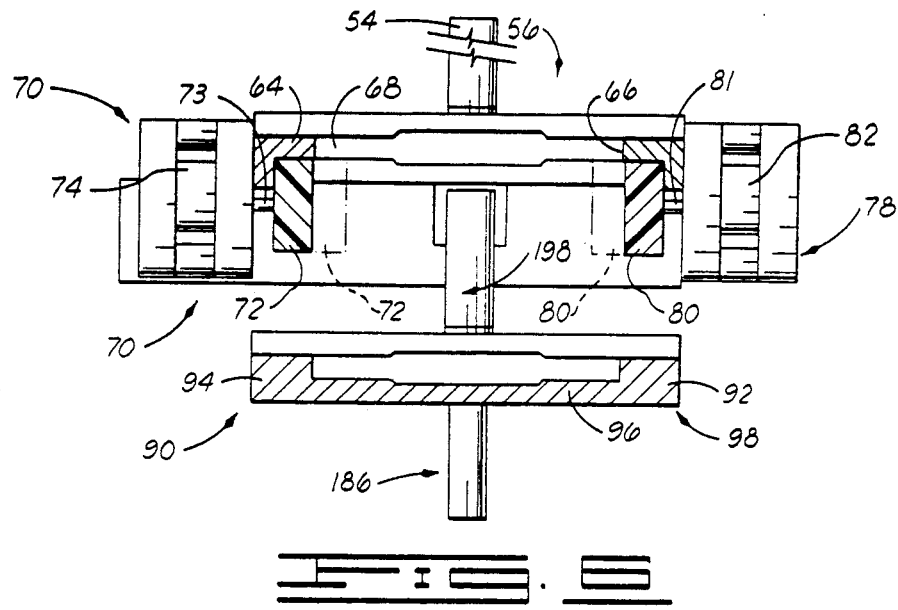
FIG. 6 is a sectional view taken along line 6—6 of FIG. 2, and showing alternate operating positions of a pair of opposed, parallel piston blocks in solid lines and in dashed lines.

A first drop chute diskette holding station, designated generally by reference numeral 56, is provided on the downstream side or lower side of the first disk drive subassembly 50, and within the first drop chute frame 20. Stated differently, the first drop chute diskette holding station 56 is located on the opposite side of the first disk drive subassembly 50 from the opening 19 located thereabove and formed through the first drop chute frame 20. The first drop chute diskette holding station 56 includes L-shaped rigid angle members 64 and 66 extending parallel to each other, and defining a large central rectangular opening 68 which is dimensioned to permit a diskette to pass therethrough (see FIG. 6).

Mounted on the rigid angle member 64 is a diskette holding piston and cylinder subassembly 70 which is substantially identical to the chute selecting piston and cylinder subassemblies 34 and 36 hereinbefore described. Thus, the holding piston and cylinder subassembly 70 includes an elongated substantially rectangular piston block 72 which is dimensioned to fit, when retracted, within the right angle corner defined by the rigid angle member 64. The rectangular piston block 72 is connected to a piston rod 73 which extends to a piston located within a cylinder 74 mounted on the outer side of the rigid angle member 64. A second diskette holding piston and cylinder subassembly 78 is similarly mounted on the L-shaped rigid angle member 66 and includes a piston block 80, a piston rod 81 and an operating cylinder 82.

As will be subsequently explained, the timing of the actuation of the first and second diskette holding piston and cylinder subassemblies 70 and 78 is such that, until the path of progression of diskettes through the apparatus ahead of the diskette which may be located at the first drop chute diskette holding station 56 has been cleared, or at least opened up to a certain point, the diskette at the holding station will be prevented from falling through the opening 68 to a part of the apparatus therebelow. This holding of the diskette results from the actuation of the cylinders 74 and 82 at that time to extend the piston blocks 72 and 80 outwardly to partially block the opening 68, as shown in dashed lines in FIG. 6. At a time when a diskette leaving the first drop chute diskette holding station 56 is permitted to gravitate downwardly through the opening 68, its downward fall is guided by the retracted piston blocks 72 and 80 (then at opposite sides of the opening 68 and aligned with the edges of this opening), and also by a pair of transversely extending guide plates 84 and 86 (see FIGS. 1 and 2).

The first drop chute diskette holding station 56 is located at the lower end of the first drop chute frame 20. After a diskette is permitted to gravitate downwardly through the opening 68 at the first drop chute diskette holding station 56, the diskette will come to rest at a second drop chute diskette holding station 90 which is located directly below, and in line with, the opening (See FIGS. 1 and 2). At the second drop chute diskette holding station 90, the opposed, parallel side edges of the diskette are retained in alignment with the second diskette drop chute as defined within a second drop chute frame 98 by a pair of opposed, parallel rails 92 and 94 disposed at opposite sides of a frame plate 96. The diskette is supported on the upper side of the frame plate 96 forming a major portion of the second drop chute frame, designated generally by reference numeral 98. As will be subsequently understood, the second drop chute diskette holding station 90 functions to hold diskettes which have arrived at that location both by the route of the first drop chute, as well as by the route of a second drop chute which will have guided them through a second disk drive subassembly as hereinafter explained.

At the downstream side of the second drop chute diskette holding station 90, a third holding piston and cylinder subassembly 100 is provided. The piston and cylinder subassembly 100 is connected to a suitable timing apparatus so that its actuation will be selectively timed to permit a diskette to be retained by an extended piston rod 101 at the second drop chute holding station for a desired period of time. After this, the diskette is released to proceed on through the apparatus in a manner hereinafter described.

From the second drop chute diskette holding station 90, jacketed diskettes which have arrived at that holding station either via either the first or the second drop chute can proceed, after a predetermined time interval at the second holding station, to move down a sorting ramp 104 into a selected one of two bin loading stations denominated generally by reference numerals 106 and 108. For greater clarity in the ensuing explanation of the invention, the bin loading station 106 will be referred to as the passing diskette or non-defective diskette loading station, and the bin loading station 108 will be referred to as the defective diskette loading station.

Each of the bin loading stations 106 and 108 lies over an opening formed in the second drop chute frame 98 adjacent the lower end of this frame Thus, a first opening 110 is formed at the location of the non-defective disk loading station 106, and another opening 112 is formed through the second drop chute frame 98 at the location of the defective disk loading station 108. In the illustrated embodiment of the invention, these openings 110 and 112 are contiguous and no transverse structural partition is provided between them.

In the first opening 110, a first bin loading subassembly 116 is mounted to a cross bar 117 and functions to load good or non-defective diskettes into the non-defective diskette bin 106, as hereinafter described. A second bin loading subassembly 118 is mounted in the opening 112 by means of a cross bar 120 extended across this opening The bin loading subassemblies 116 and 118 will be described in greater detail hereinafter.

Figure 7:
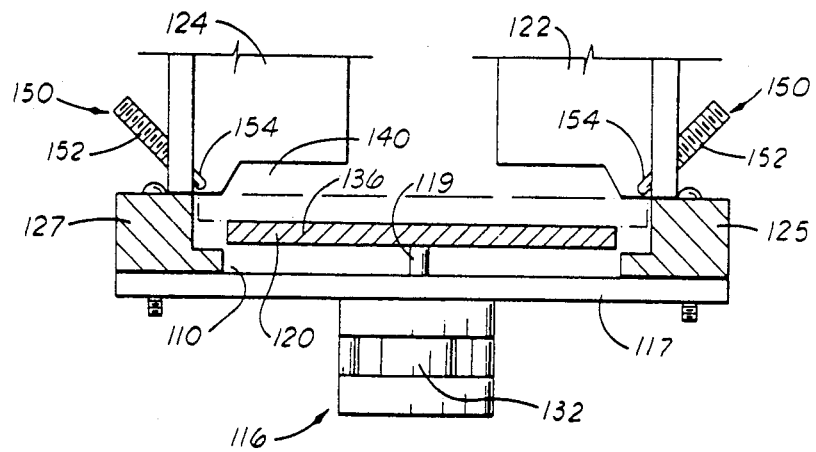
FIG. 7 is a sectional view taken along line 7—7 of FIG. 1, and illustrating, in dashed lines, a diskette resting upon an extensible lift plate which is sequentially actuated to sequentially load diskettes into a storage bin or channel.

The non-defective diskette bin 106 is defined by the lower or downstream side of the plates 84 and 86, and by a pair of elongated angle members 122 and 124. Together, the angle members 122 and 124 form two corners of the vertically extending rectangular non-defective diskette bin, and enable the diskettes to be collected and stacked therein, similarly to the angle member tracks 12 and 14 which make up the diskette feed magazine 10, and function as hereinbefore described. As shown in FIG. 7, the lower edges of the angle members 122 and 124 are spaced upwardly from the grooved rails 125 and 127 which are parts of the sorting ramp frame 104, and which define the openings 110 and 112. In similar fashion, the downstream or lower sides of the angle members 122 and 124 form one side of the defective diskette storage bin 108, and the opposite side of this bin is defined by angle members 126 and 128 which also form two of the right angle corners of this bin.

The first and second bin loading subassemblies 116 and 118 are substantially identically constructed. Referring, for purposes of description, to the first bin loading subassembly 116, this structure includes a hydraulic or pneumatic cylinder 132 which is secured to the underside of the cross bar 117, and encloses a piston (not visible) attached to one end of a piston rod 119 which is extended through the cross bar and connected to a generally rectangular reciprocating pusher plate 136. The pusher plate 136, when retracted, lies within, and substantially fills, the opening 110 located at the non-defective diskette bin loading station 106, as shown in dashed lines in FIG. 7. The upper surface of the diskette pusher plate 136 lies substantially in coplanar alignment with the diskette guide tracks cut, as grooves, into the opposed, parallel side rails 125 and 127 of the sorting ramp frame 105. A diskette is thus free to slide across the top of the diskette pusher plate 136 when its edges rest upon the guide tracks formed by the grooves in the side rails 125 and 127 of the sorting ramp frame 105, unless its movement across this diskette pusher plate is arrested.

In the same fashion, the second bin loading subassembly 118 includes a hydraulic or pneumatic cylinder 133 which is secured to the underside of the cross bar 120, and functions to reciprocably actuate its pusher plate 137. The pusher plate 137 of the second bin loading subassembly 118 substantially fills the opening 112 formed at the defective bin loading station 108. This pusher plate also has its upper surface in coplanar alignment with the guide tracks provided on the parallel side rails 125 and 127 of the sorting ramp frame 105 (see FIG. 9).

It will be perceived in referring to FIG. 7 that, as previously explained, parts of each of the angle members 122 and 124 are cut away at their lower edges to provide an opening 140 of sufficient size to permit a diskette to slide downwardly beneath the angle members in moving from the non-defective bin loading station 106, to the defective bin loading station 108. It will also be perceived, by reference to FIGS. 2 and 9 of the drawings, that at a time when the pusher plate 137 of the second bin loading subassembly 118 is extended by actuation of the cylinder 133, the pusher plate is positioned as shown in dashed lines in this figure.

At this location, the pusher plate 137 will block movement of a diskette down the rails from the non-defective bin loading station 106 to the defective bin loading station 108. The diskette will, instead, be arrested immediately over the pusher plate 136 of the first bin loading subassembly 116, from which position it can be loaded into the non-defective diskette bin 106 in a manner hereinafter described. From this description and reference to the drawings, it will be understood that the upstream edge of the pusher plate 137 of the second bin loading subassembly 118 is vertically aligned with the forward face of the transverse legs of the angle members 122 and 124 so that a diskette, when arrested against further sliding movement, at this location, and then elevated by the use of the first bin loading subassembly 116, will be forced upwardly in proper alignment for stacking into the bin defined by the angle members 122 and 124, with the leading lower edge of the diskette resting against, and retained by, these angle members.

Figure 9:
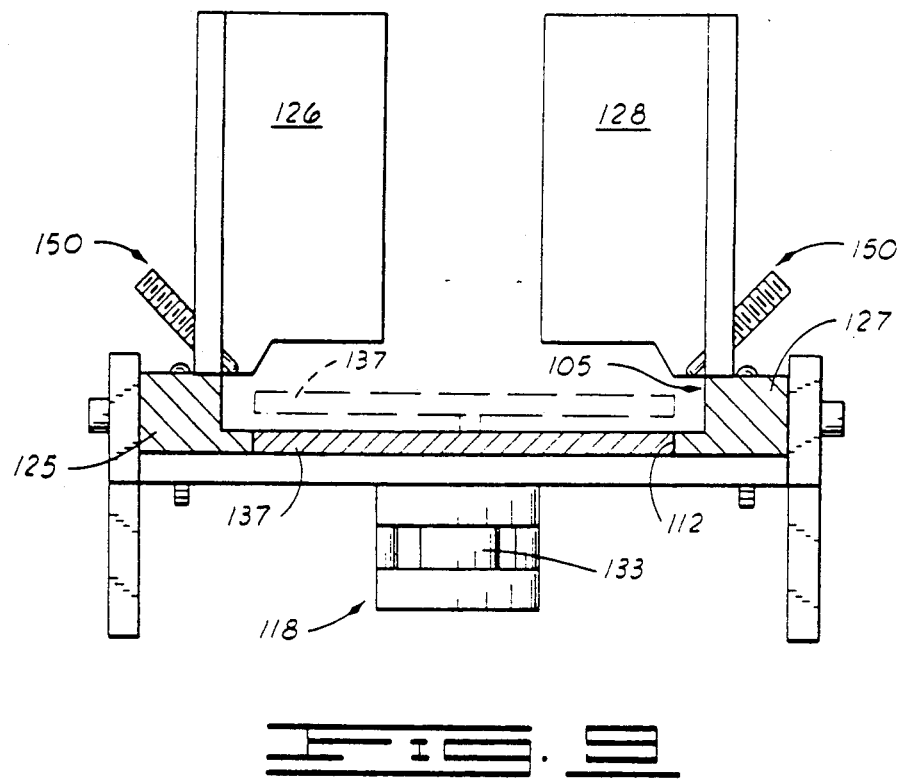
FIG. 9 is a sectional view taken along line 9—9 of FIG. 1.
Figure 10:
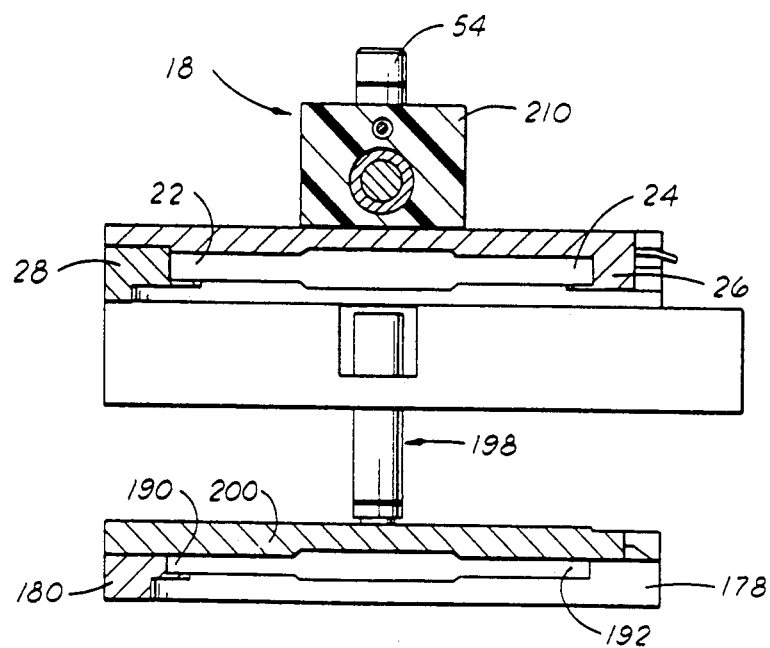
FIG. 10 is a sectional view taken along line 10—10 of FIG. 2.

It will also be understood by reference to FIGS. 7 and 9 that at a time when the pusher plate 137 of the second bin loading subassembly 118 is retracted downwardly, the diskette can pass freely across the planar upper side of this pusher plate. The diskette will then come to rest over the pusher plate 137 of the second bin loading subassembly 118 as the gravitational movement of the diskette is arrested by contact of its leading edge with the angle members 126 and 128 which define corners of the defective diskette bin.

A plurality of spring loaded dog subassemblies, each denominated generally by reference numeral 150, are provided adjacent the four corners of the defective diskette bin 108, and also adjacent the four corners of the non-defective diskette bin 106. The spring loaded dog subassemblies 150 cooperate with the first and second bin loading subassemblies 116 and 118 to enable the apparatus of the invention to incrementally build upwardly extending stacks of superimposed diskettes in the two bins as the use of the apparatus proceeds, and as numerous diskettes are processed with the apparatus, and are sorted into classes of defective and non-defective diskettes. The nature of this cooperation between the spring loaded dog subassemblies 150 and the first and second bin loading subassemblies 116 and 118 will be hereinafter described in greater detail.

Figure 8:
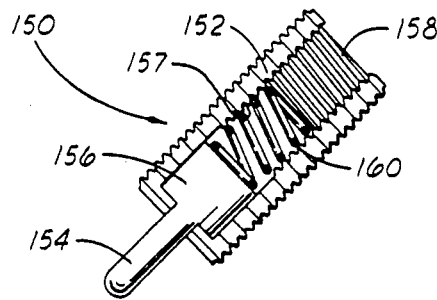
FIG. 8 is a detail view illustrating a spring biased diskette retention dog subassembly showing, in section, the cylindrical chamber in which the retention dog is reciprocably mounted.

Each of the spring loaded dog subassemblies 150 includes a small tubular element or cylinder 152 which carries an external thread (see FIG. 8). At one of its ends, each cylinder 152 is closed except for a small opening through which projects an elongated dog 154. Each dog 154 has a rounded or radiused free end, as shown in FIG. 8 of the drawings. Each dog 154 has its other end secured to a piston block 156 which is mounted for reciprocation within a smoothed walled portion of a bore 157 formed internally in the tube or cylinder 152. The remainder of the bore 157 within this tube or cylinder 152 carries an internal thread. An externally threaded plug 158 is threaded into the bore 157 after a small compression spring 160 has been placed in the bore to resiliently bias the piston block 156 and the dog 154 carried thereby to the extended position illustrated in FIG. 8. It will be understood that a force component applied axially along the axis of the dog 154 will cause the piston block 156 to compress the spring 160, and permit the dog 154 to be retracted in the cylinder 152.

As shown in FIGS. 1, 2, 7 and 9, the spring loaded dog subassemblies 150 are mounted in the apparatus so as to extend at preselected critical angles with respect to the planar faces of the pusher plates 136 and 137 forming parts of the first and second bin loading subassemblies 116 and 118, respectively. In general, the radiused free outer end of the dogs 154 in each of the spring loaded dog subassemblies 150 will be aligned immediately over the outer side edges of the respective pusher plates 136 and 137 and over the tracks or grooves formed in the side rails 125 and 127. As illustrated in FIGS. 7 and 9, the rounded outer free ends of each of the dogs 154 is positioned to contact the outer side edge of a diskette when such diskette is pushed upwardly by the pusher plate 136 or the pusher plate 137 of the two bin loading subassemblies 116 and 118.

For purposes of mounting the spring loaded dog subassemblies 150 at the described locations in the apparatus, these subassemblies are mounted either in small supporting blocks secured to the upper side of the rails 125 and 127, or they are mounted by extending them through portions of the angle members 122-128. Thus, as will be perceived in referring to FIGS. 1 and 2, the first pair of spring loaded dog subassemblies 150 are threadedly mounted in small blocks 164 and 166 secured to the upper side of the rails 125 and 127. Here the corners at the forward side of the non-defective diskette bin are defined by the angle members 84 and 86. At the opposite corners of this bin, spring loaded dog subassemblies 150 are extended through the spaced parallel legs of the two angle members 122 and 124 which form two opposite corners of this bin. This construction can probably be best perceived in FIGS. 2 and 7.

In similar fashion, a pair of opposed spring loaded dog subassemblies 150 are threadedly mounted in small blocks 170 and 172 by threaded engagement of the external threads 152 therewith, and these blocks are located adjacent two of the corners of the defective diskette bin. Two other spring loaded dog subassemblies 150 are threadedly extended through the parallel legs of the two angle members 126 and 128 which form two opposed corners of the defective diskette bin.

The jacketed diskettes may, as will by now be understood, proceed through the apparatus by way of a second drop chute. The second drop chute is, in large part, defined by grooves or tracks carried on, and forming a part of, the second drop chute frame 98. The second drop chute frame 98 has an upper end portion which is defined by a transverse plate 176 which is bounded on opposite sides by a pair of substantially parallel rails 178 and 180. With the transverse plate 176, the rails 178 and 180 form a part the second drop chute frame 98, and define tracks which will guide gravitating diskettes downwardly in the second drop chute.

It will be noted that the plate 176 is disposed beneath the opening 19 through which the jacketed diskettes are allowed to fall at a time when the diskette feeding gate subassemblies 16 and 18 are in their deactivated status in which the rectangular elongated piston blocks 30 and 32 are retracted. At this time, the opening 19 is unobstructed, and a single diskette which is released by the diskette feeding gate subassemblies 16 and 18 can fall through this opening. The diskette can, by gravity, move downwardly to the flat transverse plate 176. The diskette is aligned on this plate by contact of its opposite side edges with the raised parallel rails 178 and 180. The gravitating diskette is guided to this position atop the plate 176 by a pair of angled guide plates 182 and 184 which project upwardly between the second drop chute frame 98 and the first drop chute frame 20. Side plates (not shown) are also preferably provided in order to afford adequate diskette guidance to assure that the jacketed diskette will fall into the proper position on the upper surface of the transverse plate 176 with its lateral or side edges guiding on, and bearing against, the raised side rails 178 and 180.

It is desirable to retain a jacketed diskette which has been placed into the second drop chute in this fashion in its initial position atop the plate 176 until its further gravitating movement is properly synchronized with movement of other diskettes through the apparatus. For this purpose, a diskette holding piston and cylinder subassembly 186 is mounted centrally on the underside of the plate 176 in a position such that the extended piston rod 187 from this subassembly will be projected into the path of the jacketed diskette on the plate, and will prevent further downward movement of the diskette until it is a proper time for this to occur.

After leaving the diskette landing station constituted by the plate 176 and upper portions of the rails 178 and 180, the diskette, when allowed to do so by retraction of the piston rod 187 of the diskette holding and cylinder subassembly 186, can gravitate downwardly. The downward movement continues until it reaches the second disk drive subassembly 188 as the side edges of the diskette ride in, or are guided by, grooves 190 and 192 cut in the side rails 178 and 180.

The second disk drive subassembly 188, like the first disk drive subassembly, is a conventional computer peripheral device of standard manufacture, and is utilized for inscribing and reading information on the diskette, and for testing the diskette while it is held at the second disk drive subassembly and caused to rotate within its jacket. As in the case of the first disk drive subassembly, a jacketed diskette will usually be retained at this location, for purposes of testing or implacement of software thereon, for a period of about thirty seconds before the testing or inscription of the diskette is completed. After that time, the diskette may gravitate freely downwardly, unless there is a need to retain the diskette until the possibility of interfering with a diskette already located at the second drop chute diskette holding station is obviated. Alternately, it may be desirable to retain the diskette in the second disk drive subassembly 188 until a diskette which is being released from the first drop chute diskette holding station has gravitated down to the second drop chute diskette holding station, and is cleared from the path ahead of the diskette in the second disk drive subassembly.

In any event, at a preselected time, a diskette holding piston and cylinder subassembly 198 which is secured to a plate 200 forming a part of the second disk drive subassembly can be deactivated to retract the piston rod 201 otherwise extended therefrom into the path of movement of the diskette from the disk drive subassembly. The diskette can then move from the second disk drive subassembly to the second drop chute diskette holding station. From this location, a diskette which has moved to this holding station from the second disk drive subassembly 188 is handled in precisely the same manner as a diskette which has arrived at this second drop chute diskette holding station from the first holding station, all as has been previously described.

Having now generally described the routes by which the jacketed diskettes move through the apparatus by way of either the first drop chute or the second drop chute after the diskettes have been released one at a time from the magazine 10 constituted by the angle member tracks 12 and 14, the specific construction of each of the novel diskette feeding gate subassemblies 16 and 18 will be described. These subassemblies 16 and 18 are illustrated in section in FIGS. 3 and 3a of the drawings. In order to better explain the structure and the manner of operation of these subassemblies, a plurality of jacketed diskettes have been shown in dashed lines in the position which the diskette stack occupies in the feed magazine at a time when the diskettes are released, one-by-one, as a result of the operation of the diskette feeding gate subassemblies. The several diskettes which are shown for purposes of this discussion are denominated by reference letters "a", "b" and "c".

Figure 2:
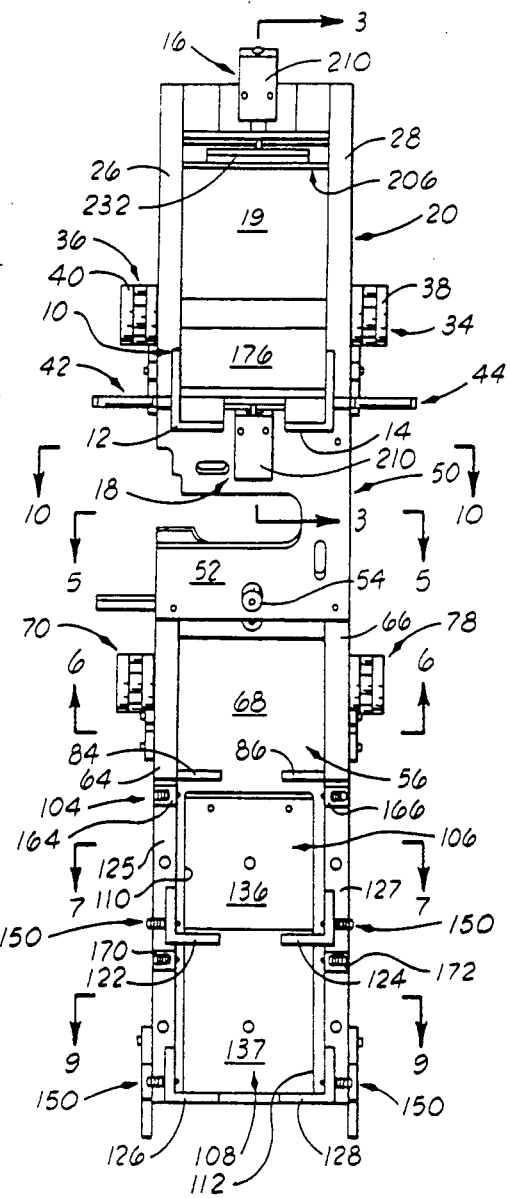
FIG. 2 is a plan view of the diskette sequential loading and storing apparatus.

It will be noted that the diskettes are supported at their lower edges between the angle member tracks 12 and 14 which make up the diskette feeding magazine 10 (see FIG. 1-3). The upper edges of the diskettes are aligned with each other, and the leading diskette rests upon support flanges 204 which are one of two flanges included in each of the angle plates 206 which form parts of each of the diskette feeding gate subassemblies 16 and 18. The other of the flanges 208 in each angle plate 206 extends across, and parallel to one side of, a cylinder block 210. Each flange 208 is secured to the outer end of a cylinder 212. A major portion of this cylinder 212 extends through a counter bore 214 and into a bore 216 in which the cylindrical body of the cylinder is slidably mounted for limited reciprocal movement therein. A helical spring 217 is mounted in the counter bore 214 and extends around the cylinder 212 so that one end of the helical spring bears against the bottom of the counter bore, and the other end of the helical spring bears against the flange 208.

The resilient bias of the helical spring 217 tends to bias the flange 208 and the angle plate 206 of which it is a part outwardly away from the cylinder block 210. This resilient bias of the spring 217 tends to move the cylinder 212 out of the bore 214 in which it is slidably mounted. Movement of the cylinder 212 in this direction is arrested, however, by a washer 218 which surrounds the shank of a headed screw 220 which is screwed into the butt end of the cylinder. This prevents the cylinder 212 from moving out of the bore 214 in the direction of the angle plate 206.

As perhaps best illustrated in FIGS. 3a and 4, a piston rod 230 is attached at its outer end to a ribbed clamp plate 232 and has its other end connected to an internal piston 234 positioned within the cylinder 212. The piston 234 functions initially, to extend this clamp plate 232 to the dashed line position when the respective diskette feeding gate subassembly 16 or 18 is actuated by charging a suitable fluid to the respective cylinder 212. When the power fluid is delivered to the space between the piston 234 and the closed end of the cylinder 212, which cylinder is, as previously described, attached to the flange 208, the initial reaction is to drive the ribbed clamp plate 232 tightly against the lateral edges of the diskettes "b" and "c". The same reaction occurs, of course, in the case of the identically constructed diskette feeding gate subassembly 18. The ribbed clamp plates 232 are guided and caused to extend perpendicular to the stack of diskettes in the magazine 10 by guide rods 233 attached to the respective clamp plates and extending into elongated holes 235 in the cylinder blocks 210.

When the two opposed clamp plates 232 of the subassemblies clamp the diskettes therebetween, however, as the diskette feeding gate subassemblies 16 and 18 are concurrently actuated, the piston rods 230 cannot then be further extended. It is therefore then necessary, in order to accommodate the fluid being charged to the space between the respective piston 234 and the closed end of the respective cylinder 212 of these subassemblies 16 and 18 that the cylinder itself slide in its bore 216 in a direction away from the respective ribbed clamp plate 232 which can no longer move away from the cylinder block 210 because of the interposition of the diskettes "b" and "c".

As each cylinder 212 is caused to slide in its respective bore 216 away from, the respective ribbed clamp plates 232, the result is that it retracts the respective angle plate 206 to which it is connected, causing the holding flange 204 to also be retracted. These retractions continue until the two holding flanges 204 of the two subassemblies 16 and 18 are no longer in the path of advance of the leading diskette "a" out of the magazine 10. This allows the leading diskette "a" to fall from a position at the bottom of the stack of diskettes in the magazine either through the opening 19, if it is time to feed the diskette to the second drop chute, or to a position in which it rests upon the upper surfaces of the rectangular pistons 30 and 32 if the diskette is to be fed into the first drop chute for gravitational advance to the first disk drive subassembly 50.

After the timing device which controls the charging of the actuating fluid to each of the cylinders 212 has timed out, so that this fluid can be discharged from the cylinders via a port 239, the first reaction will be for each cylinder to slidingly advance in its bore 216 until the stop washer 218 arrests its further movement. At this time, the holding flanges 204 of the respective subassemblies will again advance to a holding and supporting position in the path of the diskettes in the magazine. Further release of the fluid from the cylinder 212 will cause a retraction of the ribbed clamp plates 232. This allows the diskettes to again gravitate in the magazine 10 until the leading diskette rests upon the two opposed holding flanges 204.

The cycle is now complete, and is cyclically repeated upon the periodic energization of the cylinders 212.

Upon each cyclic recurrence, another diskette is fed into the first drop chute or into the second drop chute. It will be apparent from the foregoing discussion, of course, that the diskette feeding gate subassemblies 16 and 18 cooperate with each other, and are simultaneously actuated, so that the clamp plates coact in retaining the diskettes in proper position at times when the angle plates 206 have been retracted in the respective subassemblies.

OPERATION AND USE

In the operation and use of the diskette sequential loading and storing apparatus of the present invention, a number of diskettes which are to be tested, or which are to have a software program inscribed thereon, are loaded into the diskette feed magazine 10 which includes the angle member tracks 12 and 14. These function in cooperation with the diskette feeding gate subassemblies 16 and 18 to retain the diskettes in a neat stack. The diskettes are stacked in superimposed relation with their corners aligned by means of the angle member tracks 12 and 14.

It will be perceived that the status of the diskette feed magazine 10 is such that the diskettes are urged by gravity toward the lower end of the angle member tracks 12 and 14. At this location, further gravitation of the diskettes is prevented by the interposition of the diskette feed gate subassemblies 16 and 18. The diskette feeding gate subassemblies 16 and 18 prevent further gravitating of the diskettes toward the opening 19 by the interposition of the horizontally extending flanges 204 of the angle plates 206.

As has been previously explained, when the diskette feeding gate subassemblies 16 and 18 are actuated, the ribbed clamp plates 232 are forced outwardly into tight engagement with the opposite side edges of the two diskettes immediately adjacent the leading diskette which is resting upon the flanges 204. When the ribbed clamp plates 232 are forced against the diskettes, then the further introduction of power fluid into the cylinders 212 of each of the diskette feeding gate subassemblies 16 and 18 causes these cylinders to react by moving outwardly in the bores 216 in each of the cylinder blocks 210. This causes a retraction of the angle plates 206 against the resilient opposing forces of the helical springs 216. Once the flanges 204 are sufficiently retracted, the leading diskette "a" can fall toward the opening 19.

Immediately after the leading diskette is released, a suitable timing device, which is operatively connected to the diskette feeding gate subassemblies 16 and 18, allows the power fluid to be vented from the cylinders 212 so that the helical springs 217 can again force the angle plates 206 to positions such that the flanges 204 pass under and engage the next diskette "b". The diskette feeding gate subassemblies 16 and 18 are retained in this position until the timing mechanism (not shown) connected to the apparatus indicates that it is time for another diskette to be released by the diskette feeding gate subassemblies.

The leading diskette "a" which has been released by the diskette feeding gate subassemblies 16 and 18, will next either pass through the opening 19 and fall downwardly to the plate 176, or, if the program to which the apparatus responds indicates that it should do so, the apparatus will retain the diskette on the rectangular, elongated piston blocks 30 and 32. The extended piston rods of the arresting piston and cylinder subassemblies 42 and 44 may temporarily arrest the diskette at this location so that the diskette is ready to enter grooves in the opposed parallel side rails 26 and 28, and thus begin its passage through the first drop chute 20.

The control mechanism to which the apparatus is connected, and which controls and synchronizes the timed actuation of the piston and cylinder subassemblies used in the apparatus, will alternately extend the piston rods 37 and 39 to place the elongated piston blocks 30 and 32 in a position to receive and support every other diskette released from the magazine. In other words, one diskette is initially caused to first enter the first drop chute 20 and to proceed along this drop chute. Immediately after this diskette is cleared from the position immediately beneath the diskette feeding gate subassemblies 16 and 18, another diskette at the lower, feeding end of the magazine 10 is fed downwardly by the diskette feeding gate assemblies. In this case, the diskette is allowed to gravitate down to the plate 176 between the rails 178 and 180 at which point it is ready to enter the second drop chute as soon as the piston rod 187 is retracted into the cylinder of the piston and cylinder subassembly 186 to allow this diskette to proceed.

The diskette which is caught by, and supported on, the elongated piston blocks 30 and 32, is released upon retraction of the piston rods of the arresting piston and cylinder subassemblies 42 and 44 and allowed to continue gravitating into the first drop chute frame 20. The side edges are then supported in and track the parallel grooves 22 and 24 in the opposed, parallel side rails 26 and 28 forming part of the first drop chute frame 20. The diskette gravitates downwardly until it comes into position within the first disk drive subassembly 50. At this station, it is held in position by the arresting piston and cylinder subassembly 54 (by extension of the piston rod thereof) until it has been checked for defects, and/or inscribed with a software program or subjected to other treatment. In addition to this time, which normally will entail a period of about thirty seconds, the diskette will be retained at this first disc drive station until a signal from the control apparatus indicates that it can proceed on through the apparatus without contacting or fouling another diskette moving through the apparatus.

At this time the piston rod of the diskette arresting piston and cylinder subassembly 54 is retracted. Upon such retraction, the diskette can then gravitate down to the first drop chute diskette holding station 56. At this location, the diskette may either immediately pass through the opening 68 and gravitate downwardly to a position at which it comes to rest upon the second drop chute frame plate 96, or it may be prevented from passing through the opening 68 by the extension of the piston rods 73 and 81 of the first and second diskette holding piston and cylinder subassemblies. The elongated, rectangular piston blocks 72 and 80 are then moved into the positions shown in dashed lines in FIG. 6.

In this position, the piston blocks 72 and 80 catch the diskette and it is supported on the aligned upper surfaces of these piston blocks. The diskette remains in this position without further gravitation downwardly through the opening 68, and toward the second drop chute diskette holding station therebelow, until such time as the control apparatus indicates that the way is clear, and that the piston blocks 72 and 80 can be retracted. At this time, the cylinders 74 and 82 are deactivated so that the piston blocks 72 and 80 are retracted, allowing the diskette to gravitate downwardly until it comes to rest upon the frame plate 96 located between the rails 92 and 94. In falling to this position, the diskette is guided in part by the vertically extending flat guide plates 84 and 86. Lateral guide plates (not shown) may also be provided on opposite sides of the apparatus to assure that the falling diskette settles evenly into proper position on the upper surface of the frame plate 96 and between the rails 92 and 94 after gravitating through the opening 68.

It is well to note at this point that the second drop chute diskette holding station at the frame plate 96 may, at any given time, have either no diskette at that location, a diskette which has arrived at that location from the first drop chute via the opening 68, or a diskette which has arrived at that location from the second drop chute via the second disk drive subassembly 188. In any event, the control assembly, by which the sequential actuation of the various piston and cylinder subassemblies utilized in this apparatus is caused to occur, will be programmed and timed, through a series of sensing devices, if need be, which sense the location of diskettes within the apparatus at any time, so that no obstruction or interference between diskettes occurs. There is therefore never an instance where two diskettes are converging upon the same location in the apparatus at the same instance, so as to tend to occupy the same space at the same time.

The discussion will now be continued of the path of the first diskette "a" through the apparatus after it has passed through the first drop chute and has come to rest at the second drop chute diskette holding station 90. The diskette remains at this location until a third holding piston and cylinder subassembly 100 is deactivated to retract the piston rod thereof and clear the path for the diskette to gravitate downwardly from the second drop chute diskette holding station 90 onto the sorting ramp 104. The sorting ramp 104 is here used to describe that portion of the apparatus which lies below the second drop chute diskette holding station 90, and which includes, within the sorting ramp frame, the first, non-defective diskette bin loading station 106 and the second bin loading station 108 for defective diskettes. With the release of the diskette "a" from the second drop chute diskette holding station 90, this diskette will gravitate downwardly, passing beneath the pair of vertically extending, flat guide plates 84 and 86. The downward movement of the diskette will continue until it arrested either at the first non-defective diskette bin loading station 106 or passes on down to the second, defective diskette bin loading station 108.

The control system used to control the actuation of the piston and cylinder subassemblies forming parts of the first and second bin loading subassemblies in the apparatus of the present invention, will be made responsive to the intelligence, determined earlier in the apparatus, of whether a diskette landed at the second drop chute diskette holding station, and now moving from that station downwardly on the sorting ramp, is a defective diskette, or whether it is a good (non-defective) diskette. If, in fact, it has been determined at one of the disk drive subassemblies, 50 and 188, that the diskette is a good and non-defective diskette, then the control apparatus will cause the piston and cylinder of the second bin loading subassembly (the cylinder 133 and pusher plate 137) to be actuated. This will cause the pusher plate 137 to be elevated upwardly to the position shown in FIG. 9. In this position of the pusher plate 137, the diskette is prevented from moving past the first, non-defective diskette bin loading station 106. When it arrives at this station, and is over the first opening 110 and over the pusher plate 136 in this opening and pusher plate 137 blocks its further movement, the cylinder 132 is actuated to cause the pusher plate 136 to move upwardly to the position depicted in FIG. 7.

In this position, the diskette, shown in FIG. 7 in dashed lines, is pushed up so that its opposed side edges contact, and begin to push against, each of the extended dogs 154 in four of the spring loaded dog subassemblies 150. These four spring loaded dog subassemblies 150 can be perceived to be located in spaced relation to each other and over the first non-defective diskette bin loading station 106 in the positions best illustrated in FIGS. 2 and 7.

Continued extension of the piston rod forces the pusher plate 136 to an even higher elevation, and this causes the diskette to displace, and move past, the four spring loaded dog subassemblies 150. Immediately after this, the springs 157 in these several spring loaded dog subassemblies 150 force the dogs 154 to move back out to an extended position, as shown in FIG. 8. In this position, the dogs 154 extend beneath the lower side of the lowermost diskette which has just been pushed upwardly by an amount barely sufficient to permit the dogs to move back as a result of the resilient bias exerted by the springs. It will be perceived that the diskettes stacked in the bin now cannot bring a force to bear on the several dogs of the spring loaded dog subassemblies 150 along lines such that these dogs will be forced back into the respective cylinders 152 by an amount sufficient to allow the diskettes being loaded into the bin to fall back downwardly.

After this action has occurred to load a diskette into the stack being built within the non-defective diskette bin, the first diskette bin loading subassembly is deactivated to cause the pusher plate 136 to retract. The pusher plate 136 moves down to a position where it is even with the grooves formed in the opposed parallel rails 125 and 127, and thus is ready to receive or pass another diskette as soon as it has passed down the sorting ramp from the second drop chute diskette holding station 90.

If a diskette gravitating downwardly on the sorting ramp from the second diskette drop chute holding station 90 has been found to be a defective diskette, the control apparatus will have responded to this determination as developed at one of the disk drive subassemblies to cause the second bin loading subassembly 118 to be deactivated. The pusher plate 137 thereof is therefore retracted to a position where it is lowered, and its upper surface aligned with the grooves formed in the parallel side rails 125 and 127. The defective diskette can now slide all the way down the sorting ramp 104 until it comes to rest at the second bin loading station 108 with its corners snugly confined in the angles formed by the angle members 126 and 128.

When the diskette has arrived at this location, the cylinder 133 of the second bin loading subassembly 118 is charged with power fluid so as to cause the pusher plate 137 to be extended, and to push upwardly against the underside of the diskette then lying upon the pusher plate. The diskette is pushed up until it passes by the extended dogs 154 of the four spring loaded dog subassemblies 150 which are associated with the second defective diskette bin loading station 108. The diskette is pushed past these dogs to cause them to be forced back into their respective cylinders 152 against the bias of their respective springs 160. As the diskettes build up within the two bins, they are retained in orderly, neatly superimposed stacks by the confining and guiding function of the angle members 126 and 128, in the case of the defective diskette bin, and the angle members 122 and 124 in the case of the non-defective diskette bin.

With respect to a diskette which is to be passed through the apparatus from the uppermost end of the second drop chute as defined at the location of the plate 176 and the rails 178 and 180, this diskette will again be retained at this location by the arresting piston and cylinder subassembly 186 until the way is clear for the diskette to move down into the second disk drive subassembly 188. At this location, the diskette will be retained in position until it is tested or inscribed, according to the objective of placing it in the second disk drive subassembly, and then for such longer period of time as may be required in order to permit clearance of diskettes below this location within the apparatus. This holding of the diskette at the second disk drive subassembly 188 is accomplished by means of the piston and cylinder subassembly 198, and more specifically, by the extended piston rod 201 which remains extended until the controlling assembly associated with the apparatus indicates the diskette at the station is to be released.

Following release of the diskette from the second disk drive subassembly 188, it moves down to the second drop chute diskette holding station 90. Thereafter, the handling and treatment of the diskette which has originated at the upper end of the second drop chute is precisely the same as that which has been described as occurring in the case of the diskette "a", said to be originated, for purposes of description of the apparatus, at the upper end of the first drop chute. The diskette "a", it will be recalled, was retained at that location by supporting it on the rectangular, elongated piston blocks 30 and 32 until released by retracting the piston rods of the pair of arresting piston and cylinder subassemblies 42 and 44.

It should be pointed out that although the various piston and cylinder subassemblies used in the apparatus of the present invention are preferably pneumatically actuated, other types of actuation, including electrical hydraulics, can be employed, but are less preferred. It should also be pointed out that the present invention is directed primarily to certain adjuncts of the overall apparatus, which adjuncts, or subcombinations, are used in feeding the diskettes from the magazine into the apparatus, and in elevating the diskettes from their points of rest over the pusher plates of the bin loading subassemblies up into the respective bins so that the diskettes are stored in an orderly fashion.

It will be understood from the foregoing description that the control apparatus used for timing the actuation of the several piston and cylinder subassemblies, so as to assure a rapid, orderly and non-interfering progression of diskettes through the apparatus, does not constitute a part of the present invention, per se, but is merely an ancillary system, the development and construction of which is well within the skill of those having ordinary skill in this art.

Although a preferred embodiment of the invention has been herein described, it will be understood that various changes and innovations can be made in the structure illustrated and described without departure from the basic principles which underlie the invention. Changes and innovations of this type, as a result of then continued reliance upon, and use of, the basic principles, do not fall outside the spirit and scope of the invention, and are deemed to be encompassed thereby so far as a reasonably broad interpretation of the appended claims will permit.

What is claimed is:

1. An apparatus for sequentially loading and feeding diskettes to and through a diskette drive subassembly comprising:
   a diskette-containing magazine;
   means for consecutively releasing single diskettes from a plurality of diskettes contained in said magazine;
   a drop chute frame for receiving released diskettes from said magazine, said drop chute frame including a pair of downwardly extending, opposed, substantially parallel side rails having parallel grooves therein for guiding a gravitating diskette, and limiting lateral movement of the gravitating diskette as it moves downwardly on said parallel side rails;
   a disk drive subassembly including a slotted plate inclined to the vertical and positioned to receive a diskette gravitating on, and guided by, said pair of opposed, substantially parallel side rails;
   diskette arresting means mounted on said slotted plate at a position substantially central to the transverse width of said plate, and including a retractable rod extending into the path of movement of a diskette sliding down said rails with the opposite edges of the diskette in said grooves at a time when said diskette becomes positioned on the upper side of said slotted plate of said disk drive subassembly; and
   rigid parallel diskette guiding members located on the opposite side of said disk drive subassembly from, and in alignment with, said opposed side rails for guiding a diskette leaving said disk drive subassembly as it gravitates downwardly away form said disk drive subassembly.

2. An apparatus for sequentially loading and feeding diskettes as defined in claim 1 and further characterized as including:
   depository means for storing at least some of the diskettes gravitating downwardly from said disk drive subassembly; and
   loading means for receiving diskettes from said rigid guiding members and selectively loading the diskettes into said depository means.

3. An apparatus for sequentially loading and feeding diskettes as defined in claim 2 wherein said depository means includes:
   a non-defective diskette bin; and
   a defective diskette bin; and
   wherein said loading means includes means for selectively determining and loading non-defective diskettes into said non-defective diskette bin, and for loading defective diskettes into said defective diskette bin.

4. An apparatus for sequentially loading and feeding diskettes as defined in claim 1 wherein one of said parallel side rails extends across, and under, said slotted plate at one side thereof to provide support for such slotted plate, and to guide a diskette moving onto, and across, said slotted plate.

5. An apparatus for sequentially loading and feeding diskettes as defined in claim 4 wherein said one parallel side rail extends past said slotted plate and forms one of said parallel diskette guiding members.

6. An apparatus for sequentially loading and feeding diskettes as defined in claim 1 wherein said diskette-containing magazine includes:
members arranged to receive and guide each of a plurality of diskettes stacked in the magazine in a superimposed diskette stack, said diskette magazine including an upper end and a lower end;
an wherein said means for consecutively releasing single diskettes comprises:
feeding gate means at the lower end of said diskette-containing magazine for retaining the diskettes in said stack in said magazine when said feeding gate means is in a holding mode, and for releasing for gravitation into said drop chute frame, a single diskette when said feeding gate means is in a release mode.

7. An apparatus for sequentially loading and feeding diskettes as defined in claim 2 wherein said depository means comprises:
a first diskette bin; and
a second diskette bin spaced from said first diskette bin; and
wherein said loading means comprises means for sequentially and selectively guiding and directing diskettes received from said rigid parallel diskette guiding members into a selected one of first and second bins to place one type of diskette in said first bin, and a different type of diskette in said second bin.

8. An apparatus for serially passing diskettes through a diskette drive subassembly comprising:
a pair of downwardly inclined, substantially parallel side rails each having a trackway therealong for receiving and guiding one edge of a rectangular diskette supported, and guided, by said rails and gravitating downwardly thereupon;
a disk drive subassembly aligned with said parallel side rails for receiving gravitating diskettes sliding down said side rails, said disk drive subassembly including:
a rigid, generally rectangular plate slotted at one of its dies and having a second side secured to one of said side rails so that the trackway side rails guides each gravitating diskette into a disk driving position aligned with said slotted plate, and further guides each gravitating diskette out of said disk drive subassembly after each of said diskettes has been processed in said disk drive subassembly; and
diskette sorting means for consecutively identifying the presence or absence of a characteristic in the case of each gravitating diskette which is passed through said disk drive subassembly, and for moving each diskette having such characteristic to one location, and for moving each diskette not having such characteristic to a second location.

9. An apparatus for serially passing diskettes through a diskette drive subassembly as defined in claim 8 wherein said apparatus further includes a first diskette stacking bin defining said one location, and a second diskette stacking bin defining said second location, with said bins receiving diskettes sorted by said diskette sorting means.

* * * * *

UNITED STATES PATENT AND TRADEMARK OFFICE
CERTIFICATE OF CORRECTION

PATENT NO. : 5,050,023
DATED : September 17, 1991
INVENTOR(S) : Harrel D. Ashby

It is certified that error appears in the above-identified patent and that said Letters Patent is hereby corrected as shown below:

In the Claims:

In Column 20, line 9, delete "dies" and insert -sides-.

Signed and Sealed this

Twelfth Day of January, 1993

Attest:

DOUGLAS B. COMER

Attesting Officer

Acting Commissioner of Patents and Trademarks